US012462578B2

(12) United States Patent
Chang et al.

(10) Patent No.: US 12,462,578 B2
(45) Date of Patent: Nov. 4, 2025

(54) SYSTEMS AND METHODS FOR PRODUCING AMODAL CUBOIDS

(71) Applicant: Volkswagen Group of America Investments, LLC, Reston, VA (US)

(72) Inventors: Ming-Fang Chang, Santa Clara, CA (US); FNU Ratnesh Kumar, Campbell, CA (US); De Wang, Pittsburgh, PA (US); James Hays, Decatur, GA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 438 days.

(21) Appl. No.: 18/066,592

(22) Filed: Dec. 15, 2022

(65) Prior Publication Data

US 2023/0123184 A1 Apr. 20, 2023

Related U.S. Application Data

(63) Continuation of application No. 17/241,637, filed on Apr. 27, 2021, now Pat. No. 11,557,129.

(51) Int. Cl.
*G06V 20/58* (2022.01)
*G01S 17/894* (2020.01)
*G06T 7/70* (2017.01)

(52) U.S. Cl.
CPC ............ *G06V 20/58* (2022.01); *G01S 17/894* (2020.01); *G06T 7/70* (2017.01); *G06T 2207/10028* (2013.01); *G06T 2207/20072* (2013.01); *G06T 2207/20081* (2013.01); *G06T 2207/30261* (2013.01); *G06V 2201/07* (2022.01)

(58) Field of Classification Search
CPC .. G06V 20/58; G06V 2201/07; G01S 17/894; G06T 7/70; G06T 2207/10028; G06T 2207/20072; G06T 2207/20081; G06T 2207/30261
USPC ........................................................ 382/104
See application file for complete search history.

(56) References Cited

U.S. PATENT DOCUMENTS

| 10,621,747 B2 | 4/2020 | Malisiewicz et al. |
| 2019/0096086 A1 | 3/2019 | Xu et al. |
| 2019/0156569 A1 | 5/2019 | Jung et al. |

(Continued)

FOREIGN PATENT DOCUMENTS

CN          110168559 A      8/2019

OTHER PUBLICATIONS

International Search Report and Written Opinion mailed Feb. 13, 2023 for PCT/US2022/0728808 (8 pages).

(Continued)

*Primary Examiner* — Stephen P Coleman
(74) *Attorney, Agent, or Firm* — Fox Rothschild LLP

(57) ABSTRACT

This document discloses system, method, and computer program product embodiments for detecting an object. For example, the method includes generating a plurality of cuboids by performing the following operations: defining a plurality of first cuboids each encompassing lidar data points that are plotted on a respective 3D graph of a plurality of 3D graphs; accumulating the lidar data points encompassed by the plurality of first cuboids; computing an extent using the accumulated lidar data points; and defining a second cuboid that has dimensions specified by the extent. The first cuboids and/or the second cuboid may be used to detect the object.

18 Claims, 12 Drawing Sheets

(56) References Cited

U.S. PATENT DOCUMENTS

2019/0180467 A1   6/2019  Li et al.
2019/0266741 A1   8/2019  Uehara
2019/0317519 A1  10/2019  Chen
2019/0355171 A1  11/2019  Ashley
2020/0159225 A1   5/2020  Zeng et al.
2021/0027546 A1* 1/2021  Hao ..................... G06T 19/20
2021/0149022 A1   5/2021  Kehl et al.
2022/0222889 A1   7/2022  Bhargava et al.

OTHER PUBLICATIONS

Deng, Z. et al., "Amodal Detection of 3D Objects: Inferring 3D Bounding Boxes from 2D Ones in RGB-Depth Images," IEEE Conf. on Computer Vision and Pattern Recognition (CVPR) 2017.
International Search Report and Written Opinion mailed Jul. 27, 2022 in International Appln. No. PCT/US2022/071770.

* cited by examiner

SYSTEMS AND METHODS FOR PRODUCING AMODAL CUBOIDS

CROSS-REFERENCE TO RELATED APPLICATIONS

The present application is a continuation of and claims the benefit of U.S. patent Ser. No. 17/241,637 which was filed on Apr. 27, 2021 and is entitled "Systems and Methods for Producing Amodal Cuboids". The content of this application is incorporated herein by reference in its entirety.

BACKGROUND

Statement of the Technical Field

The present disclosure relates generally to autonomous vehicles. More particularly, the present disclosure relates to implementing systems and methods for producing amodal cuboids from ground truth data.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the object's trajectory, and planning paths of travel for the vehicle based on the predicted objects trajectory.

SUMMARY

The present disclosure concerns implementing systems and methods for detecting an object in a real world environment. The methods comprise generating a plurality of cuboids by performing the following operations: defining a plurality of first cuboids each encompassing lidar data points that are plotted on a respective 3D graph of a plurality of 3D graphs; accumulating the lidar data points encompassed by the plurality of first cuboids; computing an extent using the accumulated lidar data points; and/or defining a second cuboid that has dimensions specified by the extent. The first cuboids and/or the second cuboid may be used to detect the object in the real world environment.

The implementing systems can comprise: a processor; and a non-transitory computer-readable storage medium comprising programming instructions that are configured to cause the processor to implement a method for operating a vehicle and/or detecting an object.

BRIEF DESCRIPTION OF THE DRAWINGS

The present solution will be described with reference to the following drawing figures, in which like numerals represent like items throughout the figures.

DETAILED DESCRIPTION

Figure 1:
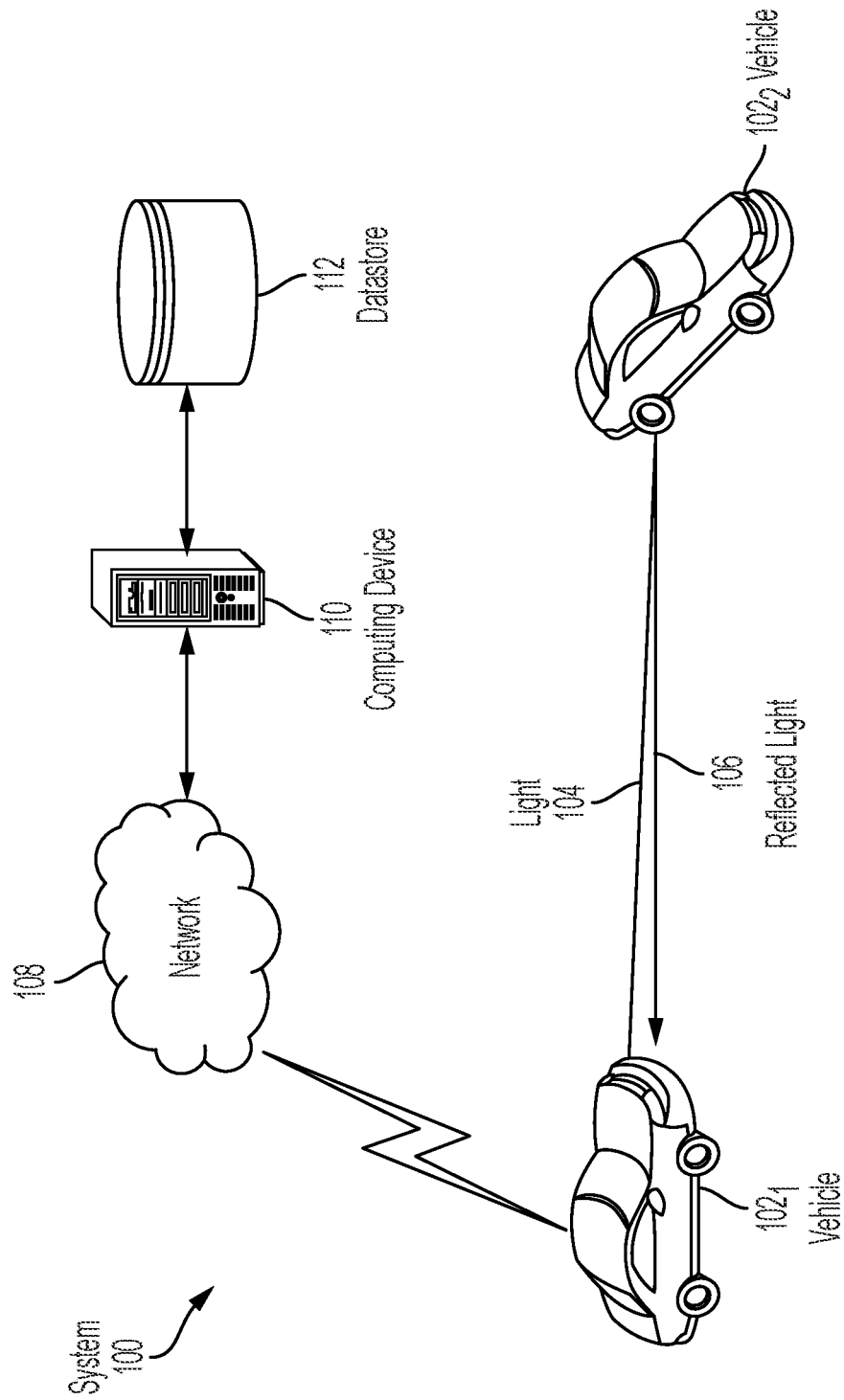
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

In order to assess the performance of the perception pipeline, systems rely on user labeled cuboids and true extent cuboids (amodal cuboids). Labelers label the cuboids in LiDAR space—which provides dimension up to visible ranges and loosely fit to the actual shape of the object. The labeled cuboids thus do not represent the true extent of the object.

This document describes implementing systems and methods that are directed to addressing the problems described above and/or other issues. Accordingly, the present solution concerns systems and methods for producing amodal cuboids and/or controlling vehicles using the same. A cuboid for an object (e.g., a vehicle) is a 3D oriented bounding box that represents (i) a heading of the object, and (ii) a full extent of the object.

The methods generally involve performing the following operations by a computing device: obtaining loose-fit cuboids overlaid on 3D graphs so as to each encompass LiDAR data points associated with a given object defining an amodal cuboid based on the loose-fit cuboids; using the amodal cuboid to train a machine learning algorithm, for example, to detect objects, to determine classifications for the objects, and/or to determine motions of the objects using sensor data generated by sensors of the autonomous vehicle or another vehicle; and causing operations of the autonomous vehicle to be controlled using the machine learning algorithm.

The computing device may also determine whether the given object is less than a first distance (e.g., 30 meters) from a LiDAR sensor. The amodal cuboid is used to train the machine learning algorithm when a determination is made that the given object is less than the first distance from the LiDAR sensor. At least one other cuboid is used when a determination is made that the given object is greater than the first distance from the LiDAR sensor. The other cuboid can include, but is not limited to, the loose-fit cuboids or a weighted cuboid generated based on the loose-fit cuboids and the amodal cuboid.

The amodal cuboid can be defined by: identifying LiDAR data points inside one of the loose-fit cuboids; removing data points from the LiDAR data points that are associated with ground; defining a tight-fit cuboid that tightly fits the LiDAR data points; accumulating LiDAR data points in the loose-fit cuboids; defining an accumulated-fit cuboid that tightly fits the accumulated LiDAR data points of the loose-fit cuboids; and/or determining an amodal extent using the accumulated-fit cuboid and prior amodal extents for an object. The amodal cuboid has dimensions specified by the amodal extent. The amodal extent may be: set equal to a maximum prior size of a prior amodal extent when a size of the accumulated-fit cuboid is greater than the maximum prior size; set equal to a minimum size of a prior amodal extent when a size of the accumulated-fit cuboid is less than the minimum prior size; or set equal to an extent of the accumulated-fit cuboid when a size of the amodal extent falls between a maximum prior size and a minimum prior size of the prior modal extents.

The coordinates for a center of the amodal cuboid is determined based on at least one of a tight-fit cuboid or a loose-fit cuboid of the loose-fit cuboids. The center of the amodal cuboid may be determined by: (i) aligning a corner of the modal cuboid with a closest visible corner of the tight-fit cuboid; and (ii) aligning a corner of the amodal cuboid such that a boundary precision between the amodal cuboid and the loose-fit cuboid is maximized.

The implementing systems can comprise: a processor; and a non-transitory computer-readable storage medium comprising programming instructions that are configured to cause the processor to implement a method for operating a vehicle.

Notably, the present solution is being described herein in the context of an autonomous vehicle. The present solution is not limited to autonomous vehicle applications. The present solution can be used in other applications such as robotic applications.

Illustrative Systems

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, a watercraft or a spacecraft.

AV $102_1$ is generally configured to detect objects in proximity thereto. The objects can include, but are not limited to, a vehicle $102_2$, cyclist (not shown) (such as a rider of a bicycle, electric scooter, motorcycle, or the like) and/or a pedestrian (not shown). The object detection may be achieved using machine learning algorithms that were trained with amodal cuboids determined in accordance with the present solution. The manner in which the amodal cuboids are determined or otherwise generated will become evident as the discussion progresses. Still, it should be understood that the amodal cuboids are determined/generated using LiDAR datasets generated by an onboard LiDAR detector of the AV and/or another vehicle. The LiDAR detector generally measures the distance to an object $102_2$ by illuminating the object $102_2$ with light 104 (e.g., a laser light) and measuring the reflected light 106 with an onboard sensor. The LiDAR detector generates a LiDAR dataset at a plurality of times t, t+1, t+2, . . . , t+n. The LiDAR datasets are processed by an onboard computing device of the AV $102_1$ and/or by a remote computing device 110 to generate amodal cuboids for objects given the LiDAR datasets. In this regard, the LiDAR datasets may be communicated from the AV $102_1$ to the remote computing device 110 over a network 108 (e.g., the Internet) via wired and/or wireless connections. The LiDAR datasets may also be stored in a memory of the AV $102_1$, which may be manually removed from the AV $102_1$ and connected to the remote computing device 110. The LiDAR datasets may additionally be stored in a remote datastore 112 (e.g., a database). The amodal cuboids for the objects are then used to train machine learning algorithms for making object detections and/or object trajectory predications/possibilities.

When such an object detection is made, AV $102_1$ performs operations to: generate one or more possible object trajectories for the detected object; analyze the generated possible object trajectory(ies) to determine a trajectory for the AV $102_1$; and cause the AV $102_1$ to follow the trajectory.

Figure 2:
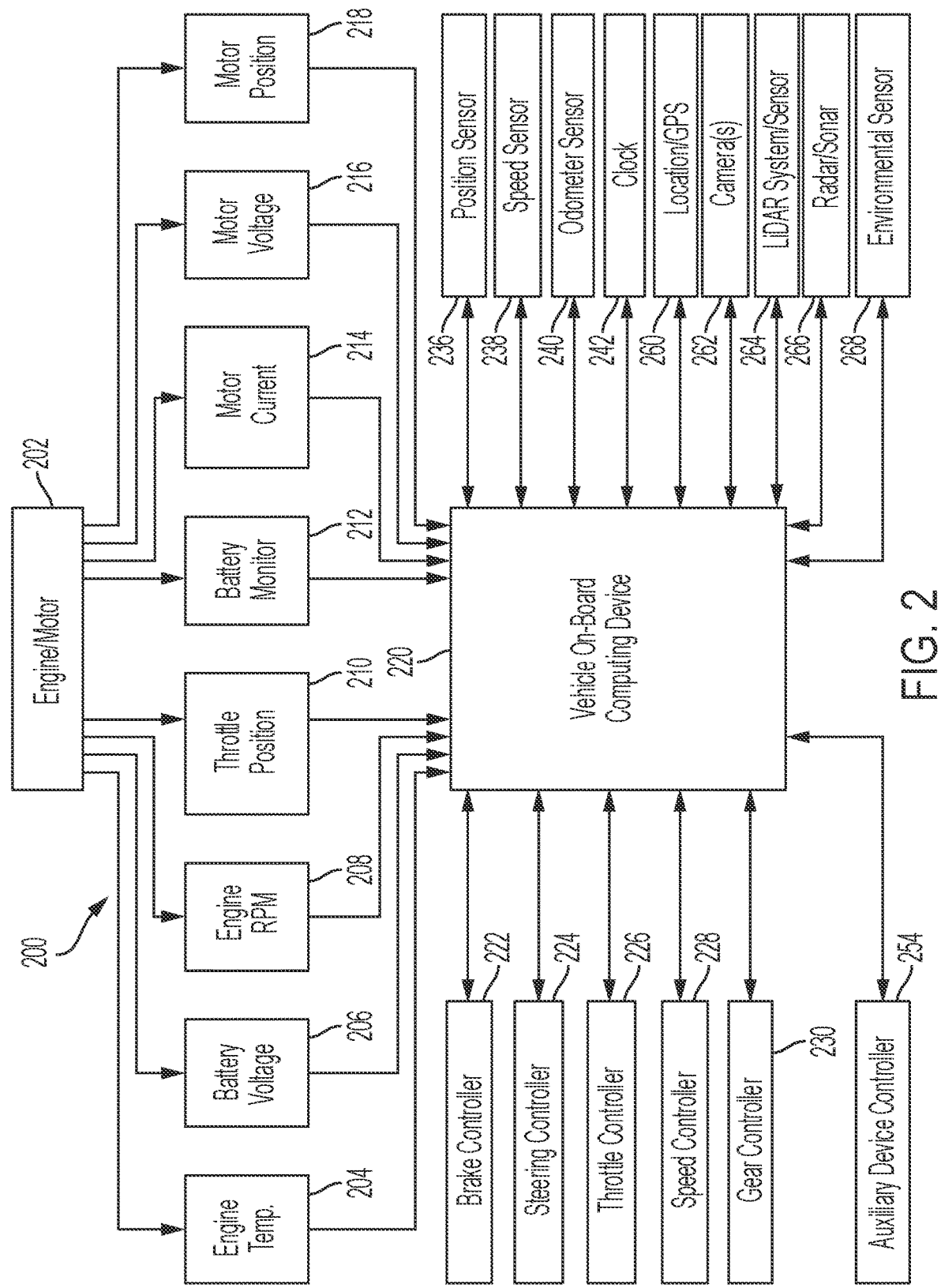
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) 102₁, 102₂ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

When the on-board computing device 220 detects a moving object, the on-board computing device 220 will generate one or more possible object trajectories for the detected object, and use the possible object trajectories to determine a vehicle trajectory for the AV. The on-board computing device 220 then performs operations to cause the AV to follow the defined vehicle trajectory. For example, the on-board computing device 220 uses the object trajectory information to decide what space has been occupied by the object, and then generates a vehicle trajectory in which the AV is not planned to travel to that space.

Figure 3:
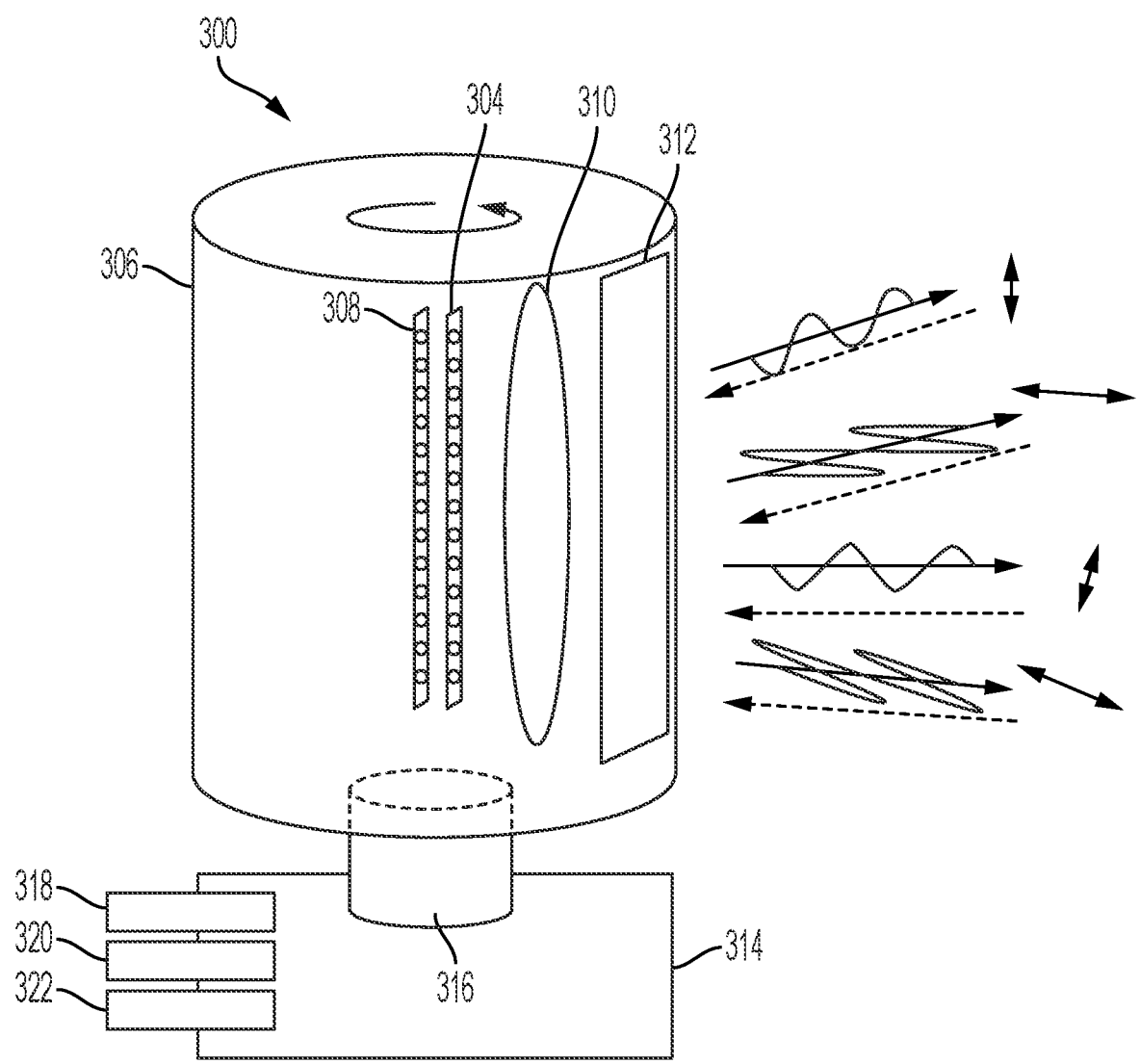
FIG. 3 is an illustration of an illustrative architecture for a LiDAR system employed by the vehicle shown in FIG. 2.

Referring now to FIG. 3, there is provided an illustration of an illustrative Li DAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned, and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or wave plates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or wave plates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave wave plate to perform, the separation and ensure that received light is directed to the receiver unit rather than to the emitter system (which could occur without such a wave plate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
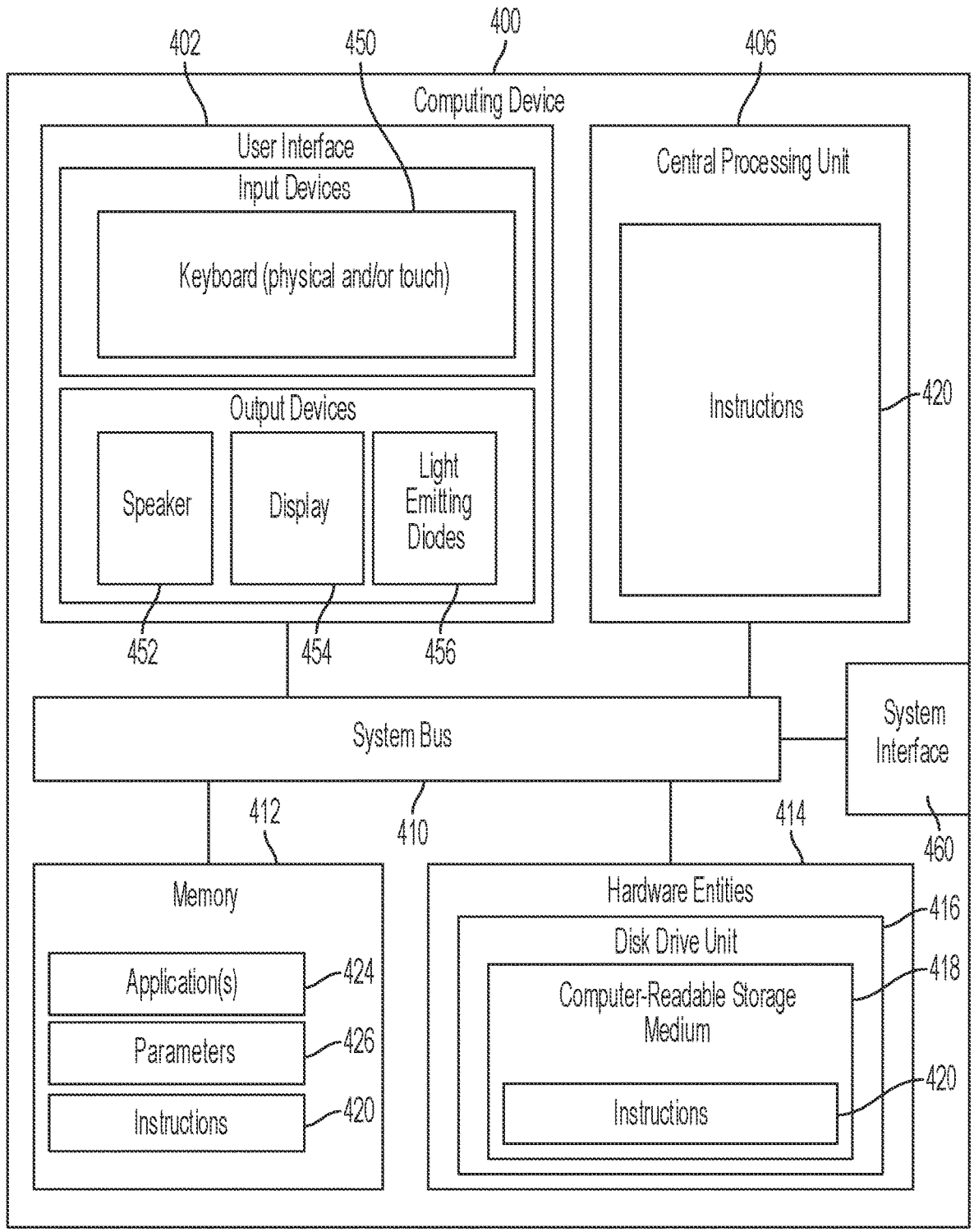
FIG. 4 is an illustration of an illustrative computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at, least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
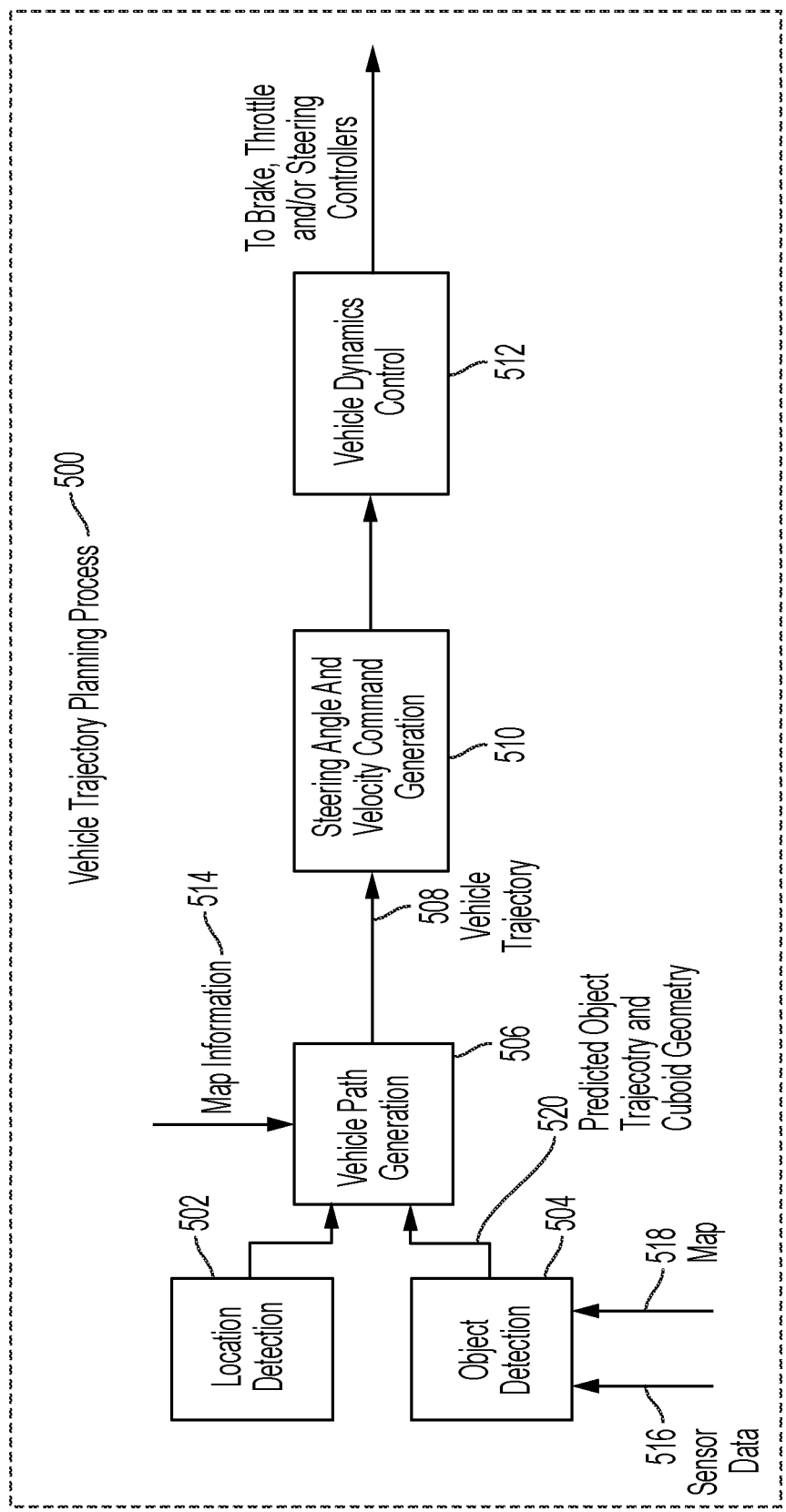
FIG. 5 provides a block diagram of an illustrative vehicle trajectory planning process.

Referring now to FIG. 5, there is provided a block diagram that is useful for understanding how movement of an AV is achieved in accordance with the present solution. All of the operations performed in blocks 502-512 can be performed by the on-board computing device of a vehicle (e.g., AV $102_1$ of FIG. 1).

In block 502, a location of the AV (e.g., AV $102_1$ of FIG. 1) is detected. This detection can be made based on sensor data output from a location sensor (e.g., location sensor 260 of FIG. 2) of the AV. This sensor data can include, but is not limited to, GPS data. The detected location of the AV is then passed to block 506.

In block 504, an object (e.g., vehicle $102_2$ of FIG. 1) is detected within proximity of the AV (e.g., <100+ meters). This detection is made based on sensor data output from a camera (e.g., camera 262 of FIG. 2) of the AV or another vehicle, and/or a LiDAR system (e.g., LiDAR system 264 of FIG. 2) of the AV or another vehicle. For example, image processing is performed to detect an instance of an object of a certain class a vehicle or pedestrian) in one or more images. LiDAR datasets are also processed to detect instances of objects of certain classes represented by point cloud data. Such sensor data processing can be achieved using machine learning algorithms that are trained based on amodal cuboids generated/produced in accordance with the present solution. The machine learning algorithms are trained to detect patterns in images and/or LiDAR datasets which identify objects of a given classes (e.g., a vehicle or pedestrian). Any machine learning algorithm can be used here. For example, one or more of the following machine learning algorithms is employed here: supervised learning; unsupervised learning; semi-supervised learning; and reinforcement learning.

Figure 8:
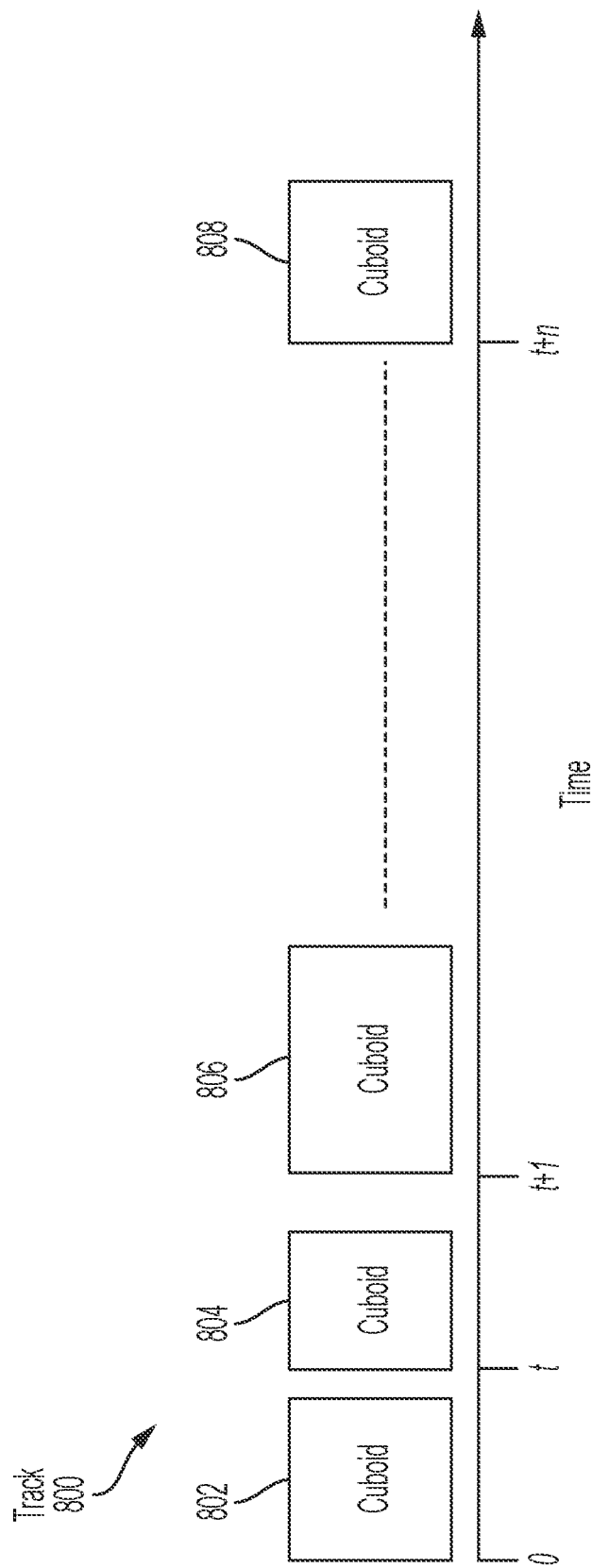
FIG. 8 provides an illustration that is useful for understanding a track for an object.

Additionally, a predicted trajectory is determined in block 504 for the object. The object's trajectory is predicted in block 504 based on results of the machine learning algorithms (e.g., an object class), a cuboid geometry, and/or a track (defined by cuboids over time as shown in FIG. 8), and/or contents of a map 518 (e.g., a road/terrain map including information specifying sidewalk locations, lane locations, lane directions of travel, driving rules, etc.).

The cuboid geometry is determined using the LiDAR dataset, images and/or the map 518. Techniques for predicting object trajectories based on cuboid geometries are well known in the art. Any known or to be known technique for predicting object trajectories based on cuboid geometries can be used herein without limitation. For example, one technique involves predicting that the object is moving on a linear path in the same direction as the heading direction of the cuboid. The predicted object trajectories can include, but are not limited to, the following trajectories:

a trajectory defined by the object's actual speed (e.g., 1 mile per hour) and actual direction of travel (e.g., west);

a trajectory defined by the object's actual speed (e.g., 1 mile per hour) and another possible direction of travel (e.g., south, south-west, or X (e.g., 40°) degrees from the object's actual direction of travel in a direction towards the AV) for the object;

a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 520 specifying the object's predicted trajectory and the cuboid geometry is provided to block 506. In some scenarios, a classification of the object is also passed to block 506. In block 506, a vehicle trajectory is generated using the information from blocks 502 and 504. Techniques for determining a vehicle trajectory using a cuboid are well known in the art. Any known or to be known technique for determining a vehicle trajectory using a cuboid can be used herein without limitation. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 520 can be determined based on the location information from block 502, the object detection information from block 504, and/or map information 514 (which is pre-stored in a data store of the vehicle). The vehicle trajectory 520 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 520 is then provided to block 508.

In block 508, a steering angle and velocity command is generated based on the vehicle trajectory 520. The steering angle and velocity command is provided to block 510 for vehicle dynamics control, i.e., the steering angle and velocity command causes the AV to follow the vehicle trajectory 508.

Illustrative Methods

Figure 6A:
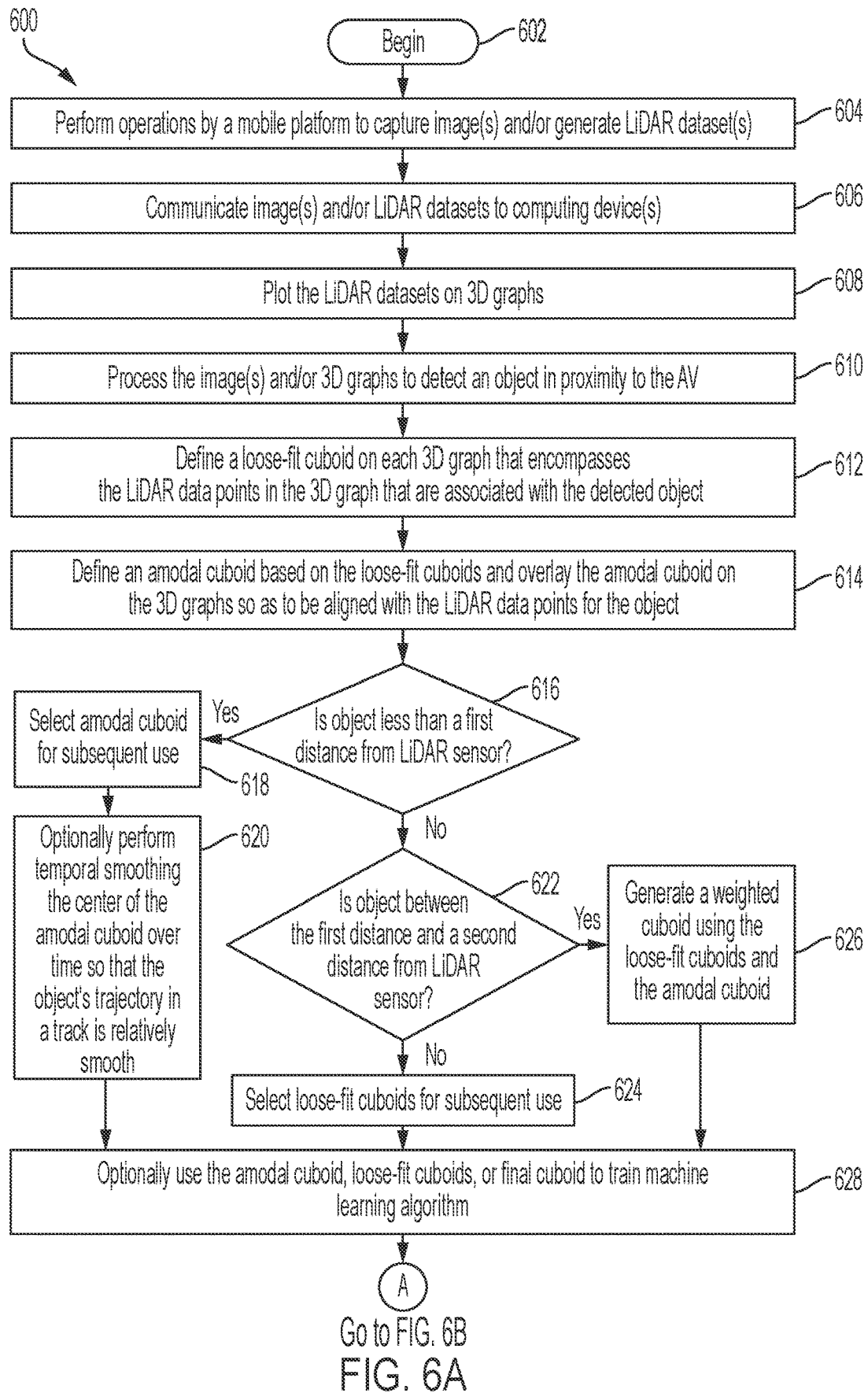
FIGS. 6A-6B (collectively referred to herein as "FIG. 6") provides a flow diagram of an illustrative method for operating a vehicle.

Referring now to FIG. 6, there is provided a flow diagram of an illustrative method 600 for operating a vehicle. Method 600 begins with 602 and continues with 604 where a mobile platform (e.g., AV $102_1$ of FIG. 1) performs operations to capture at least one image and/or generate at least one LiDAR dataset. The image(s) and/or LiDAR dataset(s) is(are) communicated in 606 to one or more computing devices (e.g., computing device 110 of FIG. 1 and/or on-board computing device 220 of FIG. 2).

At the computing device(s), the LiDAR dataset(s) is(are) plotted on 3D graph(s) as shown by 608. Each 3D graph has an x-axis, a y-axis and a z-axis with an origin defined at a center of a LiDAR sensor, the x-axis pointing forward and the z-axis pointing upward. An illustration of a LiDAR dataset 702 plotted on a graph 700 is provided in FIG. 7. Notably, graph 700 only shows the 2D point of view from the x-axis and the z-axis for ease of illustration. Techniques for plotting LiDAR datasets on 3D graphs are well known in the art, and therefore will not be described here. Any known or to be known technique for plotting LiDAR datasets on 3D graphs can be used here.

The image(s) and/or 3D graph(s) are used in 610 to detect an object that is located in proximity to the AV. This detection can be made manually by an individual or automatically/automatedly by the computing device. In the manual scenarios, the individual analyzes the 3D graphs displayed on a screen of the computing device to identify data points that appear to define an object. In the automatic/automated scenarios, the computing device can employ any known or to be known algorithm to identify data points that appear to define an object. Machine learning algorithms can be used here to facilitate the object detection(s) and/or classification(s).

A loose-fit cuboid is defined in 612 on each 3D graph. The loose-fit cuboid comprises a 3D oriented bounded box that represents (i) a heading of the object (e.g., object $102_2$ of FIG. 1). (ii) the full extent of the object (e.g., object $102_2$ of FIG. 1), and/or the center/centroid of the object. In this regard, the cuboid encompasses the LiDAR data points in the 3D graph that are associated with the detected object. The loose-fit cuboid can be defined manually or automatically/automatedly. In the manual scenarios, the individual may perform user-software interactions to draw a cuboid shape around the LiDAR data points identified in 610 with a heading direction defined by the orientation of the object. In the automatic/automated scenarios, the computing device may obtain pre-defined cuboid dimensions (a length, a width, a height) and set a center of a cuboid equal to a center of the LiDAR data points identified in 610. A loose-fit cuboid can comprise a 3D shape that (i) encompasses a given percentage (e.g., >90%) of the LiDAR data points of an object and (ii) none or a minimal number of the LiDAR data points for other objects (but allowing for the inclusion of LiDAR data points for ground surface).

Figure 7:
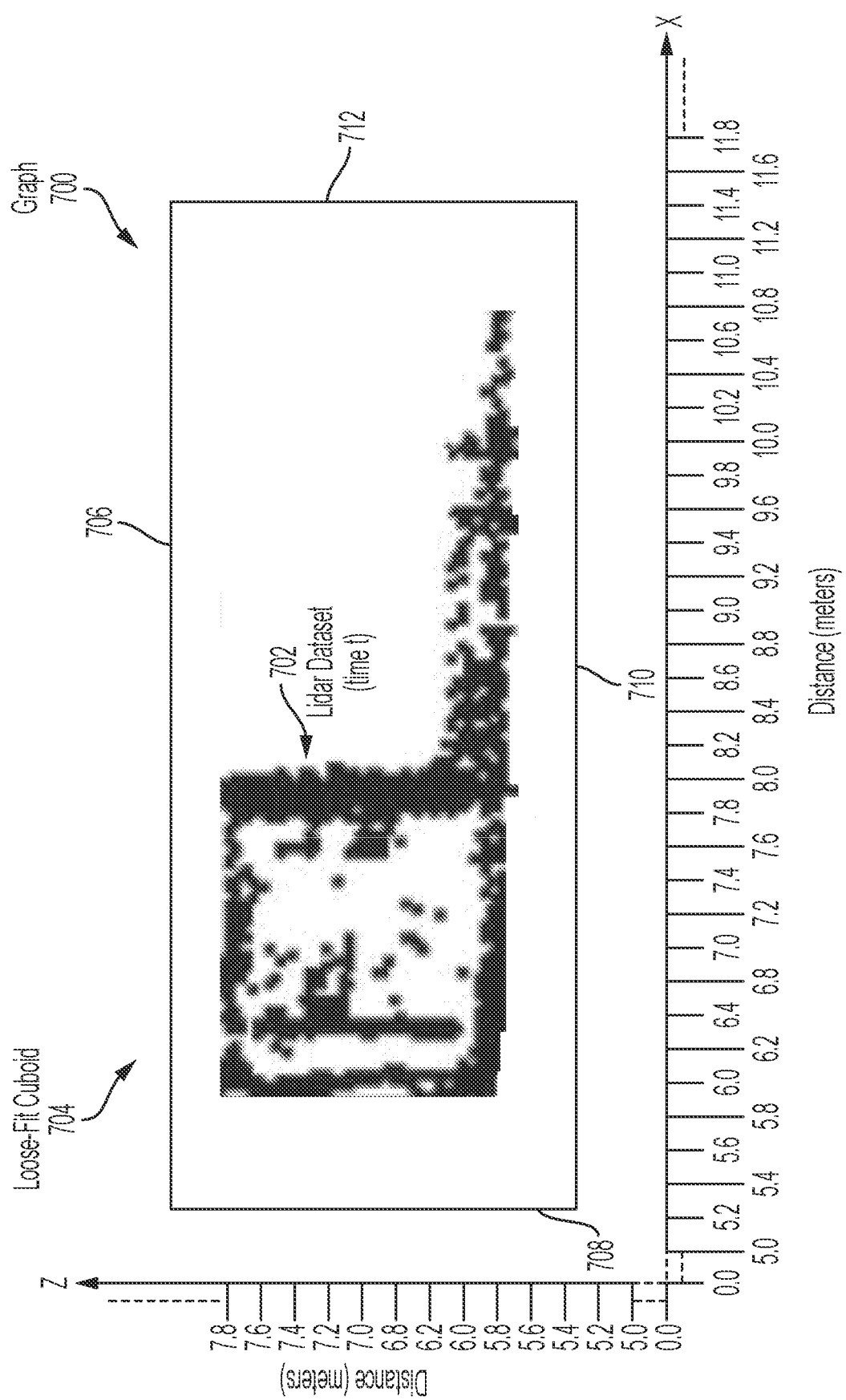
FIG. 7 provides a graph including a LiDAR dataset and a loose-fit cuboid.

An illustration showing an illustrative loose-fit cuboid 704 defined on a graph 700 is provided in FIG. 7. As shown in FIG. 7, data points of a LiDAR dataset 702 reside within the cuboid 704. Notably, none of the edges 706, 708, 710, 712 of the cuboid touch or otherwise are in contact with the data points of the LiDAR dataset 702. The present solution is not limited to the particulars of this illustration. One or more of the cuboid edges may touch or otherwise be in contact with data points of the LiDAR dataset. The loose-fit cuboid is constructed in accordance with known or to be known techniques. For example, the cuboid is constructed by: fusing the LiDAR dataset, a vector map and a visual heading; and defining a cuboid along the visual heading with a highest likelihood. The vector map contains the lane direction which provides a strong indication for a heading of the loose-fit cuboid. The visual heading is estimated for the object from the camera images. The present solution is not limited to the particulars of this example.

Figure 9:
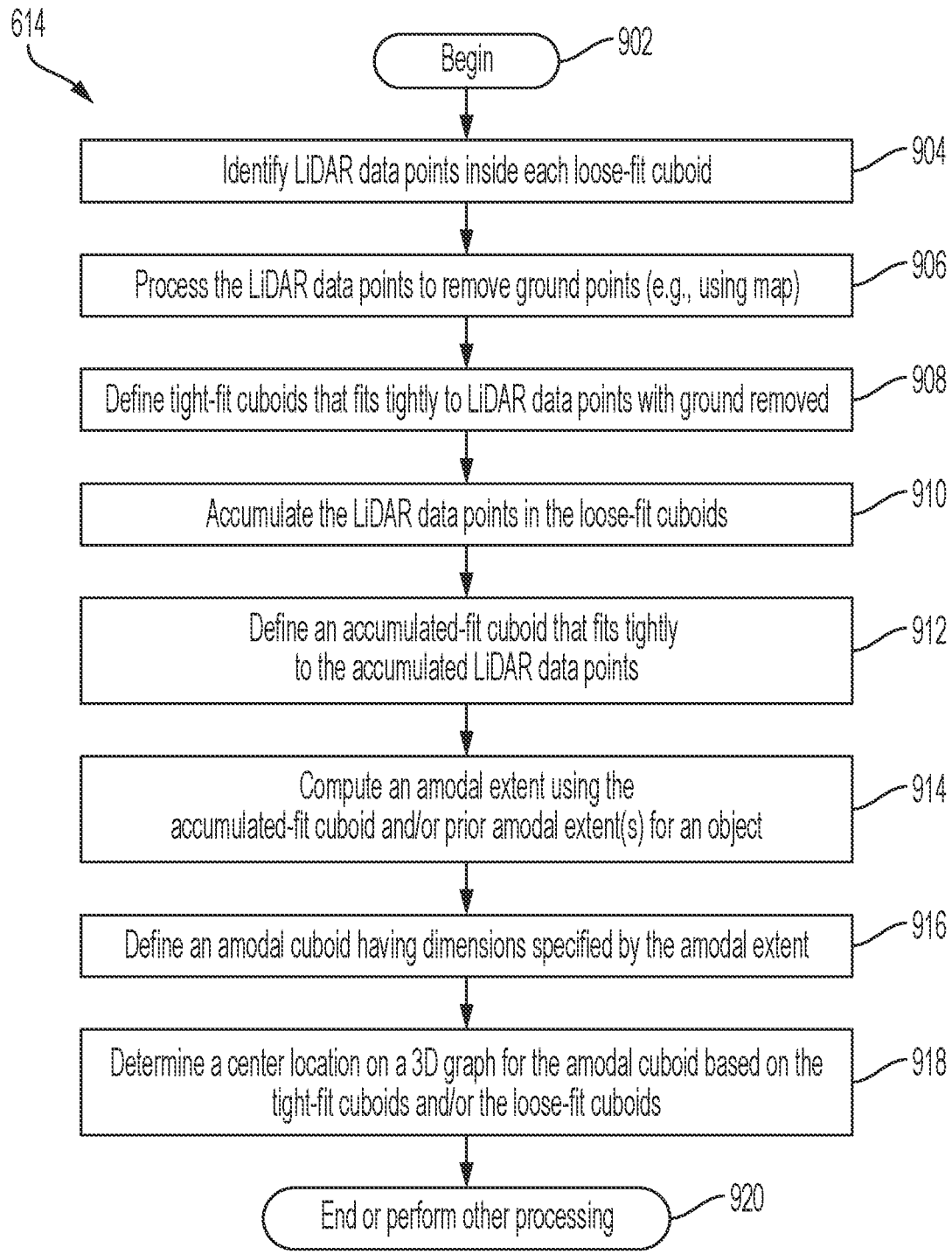
FIG. 9 provides a flow diagram of an illustration method for generating or producing an amodal cuboid.

In 614, an amodal cuboid is defined for the object based on the loose-fit cuboids. The amodal cuboid is overlaid on the 3D graphs so as to be aligned with the LiDAR data points for the object. The manner in which the amodal cuboid is defined will become evident as the discussion progresses. FIG. 9 provides a flow diagram illustrating how the amodal cuboid is defined in accordance with the present solution. FIG. 9 will be discussed in detail below. The amodal cuboid is overlaid on each 3D graph by, for example: (i) aligning a corner of the amodal cuboid with the closest visible corner of the tight-fit cuboid; and (ii) aligning a corner of the amodal cuboid such that a boundary precision between the amodal cuboid and a loose-fit cuboid is maximized. The term "boundary precision" refers to a computed intersection area between an area of the amodal cuboid and an area of a loose-fit cuboid divided by the total area of the amodal cuboid. In some scenarios, an additional extent margin on the modal cuboid is provided. This is because after aligning the closest visible corner, part of the object might fall outside of the cuboid (part of the object might be actually closer to the LiDAR sensor than the closest corner of the tight-fit cuboid). So, a given margin (e.g., 10-20 cm) may be added to the final amodal cuboid to accommodate this.

The overlaid amodal cuboids and/or 3D graphs are then used in 616-634 to facilitate driving-related operations of the AV (e.g., object detection, object tracking, object trajectory prediction, and/or AV trajectory determination). 616-624 are performed to select a cuboid for subsequent use in training a machine learning algorithm. 616-624 can be repeated for each time intervals of the object's track (e.g., track 800 of FIG. 8).

In 616, a determination is made as to whether the object is less than a first distance (e.g., 30 meters) from the LiDAR sensor (e.g., LiDAR sensor 264 of FIG. 2) of the AV. If so [616:YES], then the amodal cuboid is selected for subsequent use as shown by 618. The computing device may also perform temporal smoothing of the center of the amodal cuboid over time so that the object's trajectory in a track is relatively smooth. An illustrative track 800 is shown in FIG. 8. Track 800 comprises a plurality of cuboids for an object over time. The size of the cuboids can be the same or different at each time interval. Techniques for temporal smoothing of cuboid center locations are well known in the art.

If not [616:NO], the method 600 continues with 622 where a determination is made as to whether the object is located between the first distance (e.g., 30 meters) and a second distance (e.g., 50 meters) from the LiDAR sensor. It should be noted that the present solution is not limited to using two distance thresholds here. If there are other priors (such as the number of points in the loose-fit cuboids, the motion model of the objects), these other priors can be used to adjust the cuboid center.

Method 600 continues with 628 when a determination is made the object is located greater than the second distance from the LiDAR system [622:NO]. In 624, the loose-fit cuboid is selected for subsequent use. In contrast, when a determination is made that the object is located greater than the second distance from the LiDAR sensor [622:YES], then method 600 continues with 626 where a weighted cuboid is generated using the loose-fit cuboid and the amodal cuboid. The weighted cuboid is generated by the following mathematical equation (1).

$$W_{center}(x, y, z) = (w_1(L_{center}(x, y, z)) + w_2(A_{center}(x, y, z))) / (w_1 + w_2) \quad (1)$$

where $W_{center}(x, y, z)$ represents coordinates for a center of the weighted cuboid, $L_{center}(x, y, z)$ represents coordinates for a center of a loose-fit cuboid, $A_{center}(x, y, x)$ represents coordinates for a center of an amodal cuboid, $w_1$ represents a weight associate with the loose-fit cuboid, $w_2$ represents a weight associated with the amodal cuboid. The overall size/area of the weighted cuboid is set to the amodal size/area.

Once a cuboid has been selected, method 600 may continue with 628 where the selected cuboid is used to train one or more machine learning algorithms for object detection/classification purposes, motion prediction purposes, and/or motion planning purposes (e.g., to make predictions as to trajectories for objects). Methods for training machine learning algorithms using cuboids are well known.

Figure 6B:
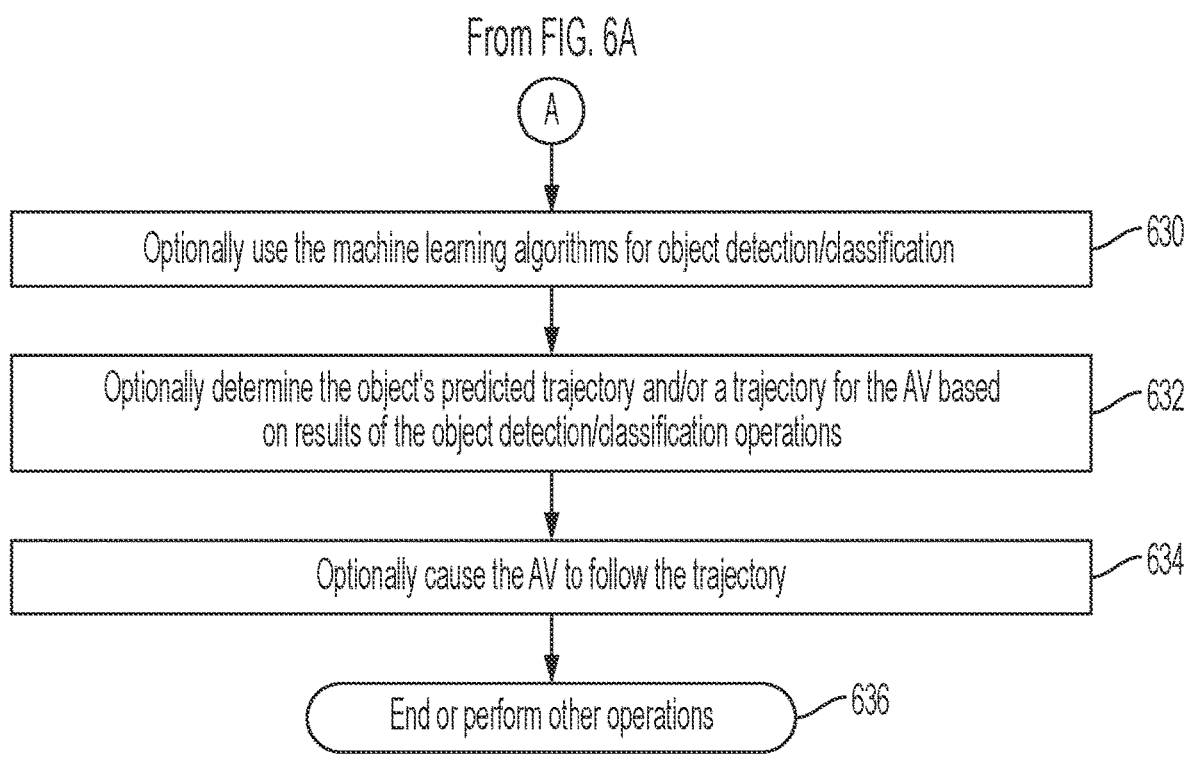

Next, method 600 continues with optional operations 630-634 of FIG. 6B. As shown in FIG. 6B, 630-634 involve: using the machine learning algorithm(s) for object detection/classification operations; determining the object's predicted trajectory and/or a trajectory for the AV based on results of the object detection/classification operations; and causing the AV to follow the trajectory. Subsequently, 636 is performed where method 600 ends or other operations are performed.

Referring now to FIG. 9, there is provided a flow diagram for defining an amodal cuboid in accordance with the present solution. As shown in FIG. 9, operation 614 of FIG. 6 begins with 902 and continues with 904 where LiDAR data points inside each loose-fit cuboid are identified. The identified LiDAR data points are processed in 906 to remove or otherwise filter ground points therefrom. The ground points can be identified using content of a road/terrain map, a known sensor height, and/or a plane fitting algorithm. Road/terrain maps are well known. The remaining LiDAR data points associated with each loose-fit cuboid are referred as a set of LiDAR data points.

In 908, a tight-fit cuboid is defined that tightly fits each set of LiDAR data points. Each tight-fit cuboid is defined by: transforming the coordinates of the loose-fit cuboid from a first coordinate system to a second different coordinate system; and adjusting the xyz coordinates of the cuboid corners to have minimal values for encompassing a given number of LiDAR data points for the object (with a tolerance for outlier LiDAR data points). The first coordinate system may comprise a LiDAR system/sensor coordinate system, i.e., an xyz coordinate system having an origin of the three axes at a center of a LiDAR system/sensor center. The second coordinate system may comprise an xyz coordinate system having an origin of the three axes at a center of an object, the x-axis pointing forward (i.e., towards the heading of the object), and the z-axis pointing upward.

In some scenarios, the tight-fit cuboid is defined by adjusting the coordinate values for each face based on the coordinates of a LiDAR data point with a smallest x-axis value in the LiDAR data points for the object, a LiDAR data point with a smallest y-axis value in the LiDAR data points for the object, a LiDAR data point with a smallest z-axis value in the LiDAR data points for the object, a LiDAR data point with a largest x-axis value in the LiDAR data points for the object, a LiDAR data point with a largest y-axis value in the LiDAR data points for the object, and a LiDAR data point with a largest z-axis value in the LiDAR data points for the object. For example, geometry coordinates for the tight-fit cuboid are selected so that the listed LiDAR data points are contained therein. Tolerance thresholds may need to be met. For example, 95% of all LiDAR data points for the object need to be included in the tight-fit cuboid. The present solution is not limited to the particulars of these examples.

Figure 10:
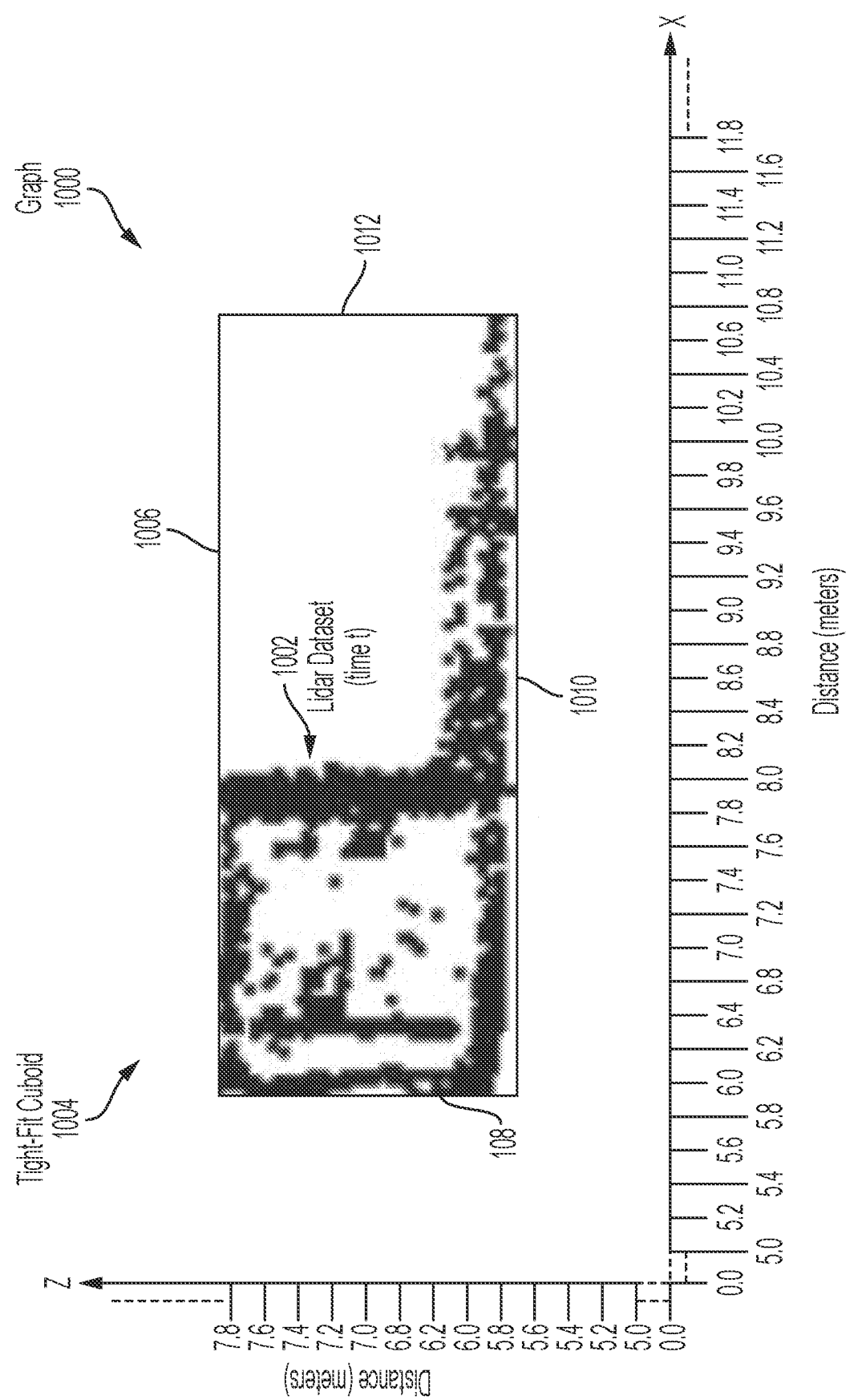
FIG. 10 provides a graph including a LiDAR dataset and a tight-fit cuboid.

An illustration of a tight-fit cuboid 1004 plotted on a graph 1000 is provided in FIG. 10. As shown in FIG. 10, data points of a LiDAR dataset 1002 reside within the cuboid 1004. The LiDAR dataset 1002 can comprise LiDAR dataset 702 of FIG. 7 with data points for ground removed therefrom. Notably, the edges 1006, 1008, 1010, 1012 of the cuboid touch or otherwise are in contact with the data points of the LiDAR dataset 1002. The present solution is not limited to the particulars of this illustration. For example, one or more data points of the LiDAR dataset may reside outside of the tight-fit cuboid 1004 in accordance with tolerance thresholds. The present solution is not limited to the particulars of FIG. 10 and/or the example.

Next in 910, the LiDAR data points in the loose-fit cuboids of a track are transformed into a second coordinate system and then accumulated into a single 3D graph. For example, the LiDAR data points of loose-fit cuboids 802, 804, 806, 808 of track 800 shown in FIG. 8 are accumulated into a single 3D graph. A cuboid is defined in 912 that fits tightly to the accumulated LiDAR data points. This cuboid can be defined in the same or similar manner of the tight-fit cuboid of 908. The cuboid of 912 is referred to herein as an accumulated-fit cuboid.

Figure 11:
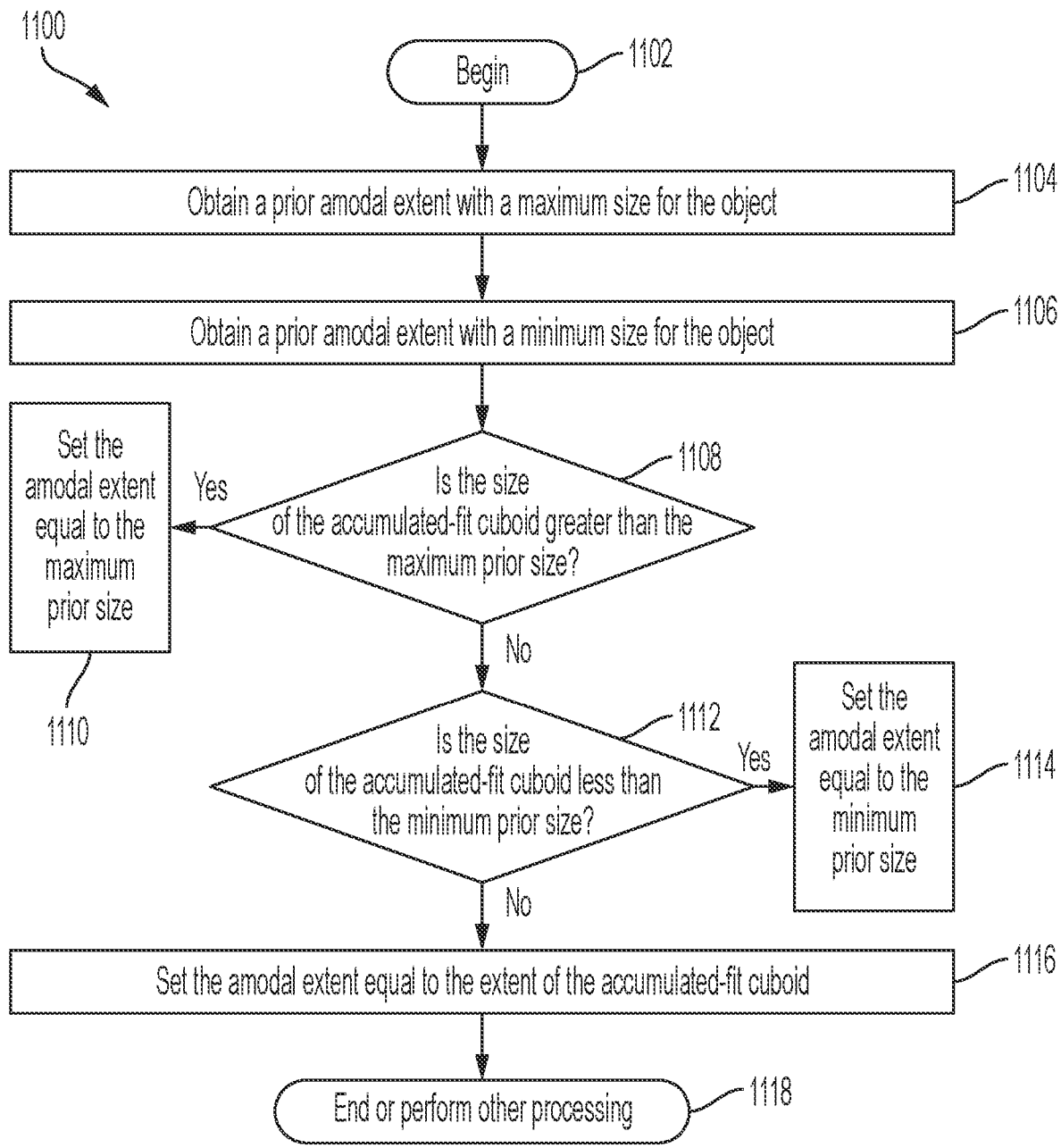
FIG. 11 provides a flow diagram of an illustrative method for determining an amodal extent.

In 914, an amodal extent is computed or otherwise determined using the accumulated-fit cuboid and/or prior amodal extent(s) for the object. A flow diagram is provided in FIG. 11 that is useful for understanding how the amodal extent is computed/determined. FIG. 11 will be discussed below. In 916, an amodal cuboid is defined for the object. The amodal cuboid has dimensions specified by the amodal extent computed in 914.

In 918, xyz coordinates for a center of the amodal cuboid is determined based on the tight-fit cuboid and/or loose-fit cuboids. For example, the center coordinates of the amodal cuboid are determined by: (i) aligning a corner of the amodal cuboid with the closest visible corner of the tight-fit cuboid: and (ii) aligning a corner of the amodal cuboid such that a boundary precision between the amodal cuboid and a loose-fit cuboid is maximized. Once aligned, the coordinates of the modal cuboid's center are specified or otherwise obtained. Subsequently, 920 is performed where method 900 ends or other operations are performed.

Referring now to FIG. 11, there is provided a flow diagram of an illustrative method 1100 for determining an amodal extent. The present solution is not limited to the particular order of operations as shown in FIG. 11. For example, operations 1104 and 1106 may be performed concurrently or in an opposite order than that shown in FIG. 11.

Method 1100 begins with 1102 and continues with 1104 where a prior amodal extent is obtained that has a maximum size for the object. Another prior amodal extent is obtained in 1106 that has a minimum size for the object. If the size of the accumulated-fit cuboid is greater than the maximum prior size [1108:YES], then the amodal extent is set equal to the maximum prior size as shown by 1110. If the size of the accumulated-fit cuboid is less than the minimum prior size [1112:YES], then the amodal extent is set equal to the minimum prior size as shown by 1114. Otherwise, the amodal extent is set equal to the extent of the accumulated-fit cuboid as shown by 1116. Subsequently, 1118 is performed where method 1100 ends or continues with other operations.

An illustrative algorithm for using a maximum prior size to define a height of an amodal extent is provided below.

std: :min(std: :max(frame_metadata.per_frame fit_box.height, gt_acc_metadata.max_dims.get("h"_s)), min_object dimensions_.at(label_class.at("height")), max_object_dims.at("height"));

Steps Summary (repeated per frame, and step 3 is the final output from the last frame of existence):
1. Compute max of {per-frame-lidar-fit-height; current max height}->o_s1
2. Compute max of {o_s1; min-prior-size-fit-for-height}->o_s2
3. Compute min of {o_s2, max-prior-size-for-height}

An illustrative algorithm for using a maximum prior size to define an amodal extent is provided below.

Compare tight fit with labels (GT/User labels)
Std:max(std::min(v_fit, v_label), v_current)←select size(v_current, v_fit, v_label)
v_fit->accumulated lidar fit
v_current->current max length
v_label->GT
max_I=std::min(select_size(gt_acc_metadata.max_bbox-length, I_fit_acc, frame_metadata.label_box.length), max_object_dims.at("length"));

Overall Summary (at Each Time Step):
Find the minimum of {accumulated lidar fit; GT laebl}: o_s1 [Note this is the accumulated fit at time step]
Find the maximum of {o_s1; current_max_length}; o_s2
Find the maximum of {o_s2; prior_max_dimensions}

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for using an object detection in a real world environment, comprising:
generating, by the computing device, a plurality of cuboids by performing the following operations:
defining a plurality of first cuboids each encompassing lidar data points that are plotted on a respective 3D graph of a plurality of 3D graphs;
accumulating the lidar data points encompassed by the plurality of first cuboids;
computing an extent using the accumulated lidar data points;
defining a second cuboid that has dimensions specified by the extent;
selectively using, by the computing device, the plurality of first cuboids or the second cuboid to detect an object in the real world environment;
using the second cuboid to predict a trajectory for the object; and
executing one or more control instructions that cause a robotic system to adjust one or more autonomous movements based on the trajectory predicted for the object.

2. The method according to claim 1, further comprising controlling autonomous operations of a robotic system responsive to detection of the object in the real world environment.

3. The method according to claim 1, wherein the selectively using the plurality of first cuboids or the second cuboid to detect the object is based on a location of the object in the real world environment.

4. The method according to claim 1, wherein generating a plurality of cuboids further comprises:
defining a plurality of third cuboids by adjusting corner coordinates of the plurality of first cuboids; and
selecting coordinates for a center for the second cuboid based on the plurality of third cuboids.

5. The method according to claim 4, wherein the coordinates for the center of the second cuboid are selected by aligning a corner of the second cuboid with a closest visible corner of each one of said plurality of third cuboids.

6. The method according to claim 4, wherein the selecting coordinates for the center of the second cuboid is based additionally on the plurality of first cuboids.

7. The method according to claim 6, wherein the coordinates for the center of the second cuboid are selected by aligning a corner of the second cuboid such that a boundary precision between the second cuboid and each of the plurality of first cuboids is maximized.

8. The method according to claim 1, wherein the generating a plurality of cuboids further comprises removing ground points from the lidar data points encompassed by the plurality of first cuboids.

9. The method according to claim 1, further comprising:
generating a fourth cuboid using the plurality of first cuboids and the second cuboid; and
selectively using the fourth cuboid to detect the object in the real world environment in addition to or as an alternative to the plurality of first cuboids or the second cuboid.

10. A system, comprising:
a processor;
a non-transitory computer-readable storage medium comprising programming instructions that are configured to cause the processor to implement a method for using an object detection in a real world environment, wherein the programming instructions comprise instructions to:
generate a plurality of cuboids by performing the following operations:
defining a plurality of first cuboids each encompassing lidar data points that are plotted on a respective 3D graph of a plurality of 3D graphs;
accumulating the lidar data points encompassed by the plurality of first cuboids;
computing an extent using the accumulated lidar data points;
defining a second cuboid that has dimensions specified by the extent;
selectively use the plurality of first cuboids or the second cuboid to detect an object in the real world environment;
use the second cuboid to predict a trajectory for the object; and
executing one or more control instructions that cause a robotic system to adjust one or more autonomous movements based on the trajectory predicted for the object.

11. The system according to claim 10, wherein the programming instructions further comprise instructions to control autonomous operations of a robotic system responsive to detection of the object in the real world environment.

12. The system according to claim 10, wherein the plurality of first cuboids or the second cuboid is selectively used to detect the object based on a location of the object in the real world environment.

13. The system according to claim 10, wherein the programming instructions further comprise instructions to:
define a plurality of third cuboids by adjusting corner coordinates of the plurality of first cuboids; and
select coordinates for a center for the second cuboid based on the plurality of third cuboids.

14. The system according to claim 13, wherein the coordinates for a center of the second cuboid are selected by aligning a corner of the second cuboid with a closest visible corner of each one of said plurality of third cuboids.

15. The system according to claim 13, wherein the coordinates for the center of the second cuboid are selected based additionally on the plurality of first cuboids.

16. The system according to claim 15, wherein the coordinates for the center of the second cuboid are selected by aligning a corner of the second cuboid such that a boundary precision between the second cuboid and each of the plurality of first cuboids is maximized.

17. The system according to claim 10, wherein the programming instructions further comprise instructions to remove ground points from the lidar data points encompassed by the plurality of first cuboids.

18. A non-transitory computer-readable medium that stores instructions that, when executed by at least one computing device, will cause the at least one computing device to perform operations comprising:
generating a plurality of cuboids by performing the following operations:
defining a plurality of first cuboids each encompassing lidar data points that are plotted on a respective 3D graph of a plurality of 3D graphs;
accumulating the lidar data points encompassed by the plurality of first cuboids;
computing an extent using the accumulated lidar data points;
defining a second cuboid that has dimensions specified by the extent;
selectively using, by the computing device, the plurality of first cuboids or the second cuboid to detect the object in the real world environment;
using the second cuboid to predict a trajectory for the object; and
executing one or more control instructions that cause a robotic system to adjust one or more autonomous movements based on the trajectory predicted for the object.

* * * * *